United States Patent
Kang et al.

(10) Patent No.: US 11,842,075 B2
(45) Date of Patent: Dec. 12, 2023

(54) STORAGE DEVICES AND METHODS FOR OPERATING THE DEVICES

(71) Applicant: Samsung Electronics Co., Ltd., Suwon-si (KR)

(72) Inventors: Yun Seok Kang, Hwaseong-si (KR); Jae Sub Kim, Seoul (KR); Yang Woo Roh, Hwaseong-si (KR); Jeong Beom Seo, Seoul (KR); Kyung Wook Ye, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 43 days.

(21) Appl. No.: 17/411,440

(22) Filed: Aug. 25, 2021

(65) Prior Publication Data

US 2022/0236915 A1     Jul. 28, 2022

(30) Foreign Application Priority Data

Jan. 22, 2021   (KR) .................. 10-2021-0009087

(51) Int. Cl.
*G06F 3/06*     (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ....... G06F 3/0604; G06F 3/061; G06F 3/0659
See application file for complete search history.

(56) References Cited

U.S. PATENT DOCUMENTS

| | | | |
|---|---|---|---|
| 4,740,922 A | 4/1988 | Ogawa | |
| 7,624,198 B1 | 11/2009 | Johnson et al. | |
| 7,679,133 B2 | 3/2010 | Son et al. | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 9,135,994 B2 | 9/2015 | Kwon et al. | |
| 9,529,707 B2 | 12/2016 | Nakamura et al. | |
| 10,521,293 B2 | 12/2019 | Cha et al. | |
| 10,579,524 B1 | 3/2020 | Mattina et al. | |
| 10,635,356 B2 | 4/2020 | Ngu et al. | |
| 2006/0077737 A1* | 4/2006 | Ooishi | G11C 13/0069 365/203 |
| 2010/0079904 A1* | 4/2010 | Sato | G06F 3/0608 |
| 2011/0233648 A1 | 9/2011 | Seol et al. | |

(Continued)

*Primary Examiner* — Ryan Bertram
(74) *Attorney, Agent, or Firm* — Harness, Dickey & Pierce, P.L.C.

(57) ABSTRACT

A storage device comprises a nonvolatile memory configured to store data that is written in size units of a mapping size, and a storage controller configured to transmit a command to the nonvolatile memory. The storage controller includes a host interface configured to receive a write command from a host device, the write command including a command to write first data to a first address, the first data having a first size smaller than the mapping size. The storage controller includes processing circuitry configured to transmit a read command to the nonvolatile memory, to cause the nonvolatile memory to read second data stored in the nonvolatile memory addressed based on the first address, in response to a determination that the first size is smaller than the mapping size and before the first data is received at the storage controller through the host interface.

13 Claims, 13 Drawing Sheets

(56) References Cited

U.S. PATENT DOCUMENTS

| | | | |
|---|---|---|---|
| 2012/0221809 A1* | 8/2012 | Yoshikawa | G06F 3/0613 711/155 |
| 2015/0347320 A1* | 12/2015 | Spillane | G06F 12/0246 713/193 |
| 2016/0139837 A1* | 5/2016 | Welker | G06F 3/0673 711/155 |
| 2018/0189133 A1* | 7/2018 | Prathapan | G11C 11/1675 |
| 2021/0209030 A1* | 7/2021 | Gorrle | G06F 12/04 |
| 2022/0291993 A1* | 9/2022 | Otsuka | G06F 12/04 |

* cited by examiner

STORAGE DEVICES AND METHODS FOR OPERATING THE DEVICES

CROSS-REFERENCE TO RELATED APPLICATIONS

This application claims priority from Korean Patent Application No. 10-2021-0009087 filed on Jan. 22, 2021 in the Korean Intellectual Property Office, the disclosure of which is incorporated herein by reference in its entirety.

BACKGROUND

The present inventive concepts relate to storage devices and methods for operating the storage devices.

A NAND flash memory, which is one of storage devices, may not be able to perform in-place write when changing stored data.

SUMMARY

Aspects of the present inventive concepts provide a storage device having improved operating performance. The storage device (e.g., a device including a NAND flash memory) may be configured to change data having a smaller size than a mapping size, which is a data storage unit of a NAND flash memory, and may implement a read-modify-write operation which reads existing stored data, merges it with the new data, and transcribes it into another page with reduced or minimized execution time.

Aspects (e.g., example embodiments) of the present inventive concepts also provide a method for operating a storage device having improved operating performance.

However, example embodiments of the present inventive concepts are not restricted to the example embodiments set forth herein. The and other aspects of the present inventive concepts will become more apparent to one of ordinary skill in the art to which the present inventive concepts pertains by referencing the detailed description of the present inventive concepts given below.

Some example embodiments provide a storage device. The storage device may include a nonvolatile configured to store data that is written in size units of a mapping size, and a storage controller configured to transmit a command to the nonvolatile memory. The storage controller may include a host interface configured to receive a write command from a host device, the write command including a command to write first data to a first address, the first data having a first size smaller than the mapping size. The storage controller may include processing circuitry configured to transmit a read command to the nonvolatile memory, to cause the nonvolatile memory to read second data stored in the nonvolatile memory addressed based on the first address, in response to a determination that the first size is smaller than the mapping size and before the first data is received at the storage controller through the host interface.

Some example embodiments provide a storage device. The storage device may include a nonvolatile memory configured to store data that is written in size units of a mapping size, and a storage controller configured to transmit a command to the nonvolatile memory, wherein the storage controller includes a host interface configured to receive a write command from a host device, the write command including a command to write first data to a first address, the first data having a first size that is smaller than the mapping size, a memory interface configured to transmit a memory command corresponding to the write command to the nonvolatile memory, and processing circuitry configured to transmit a read command to the nonvolatile memory to cause the nonvolatile memory to read second data stored in the nonvolatile memory addressed based on the first address through the memory interface, in response to a determination that the first size is smaller than the mapping size and before the first data is received through the host interface.

Some example embodiments provide a method for operating a storage device. The method may include providing a nonvolatile memory on which data is written in size units of a mapping size, and a storage controller that is configured to transmit a memory command to the nonvolatile memory. The method may include receiving, at the storage controller, a write command that includes a command to write first data of a first size to a first address. The method may include transmitting a read command to the nonvolatile memory to cause the nonvolatile memory to read second data stored in the nonvolatile memory addressed based on the first address in response to a determination that the first size is smaller than the mapping size, before the first data is received at the storage controller.

BRIEF DESCRIPTION OF THE DRAWINGS

The and other aspects and features of the present inventive concepts will become more apparent by describing in detail example embodiments thereof referring to the attached drawings, in which.

DETAILED DESCRIPTION

Hereinafter, some example embodiments according to the technical idea of the present inventive concepts will be described referring to the accompanying drawings.

Figure 1:
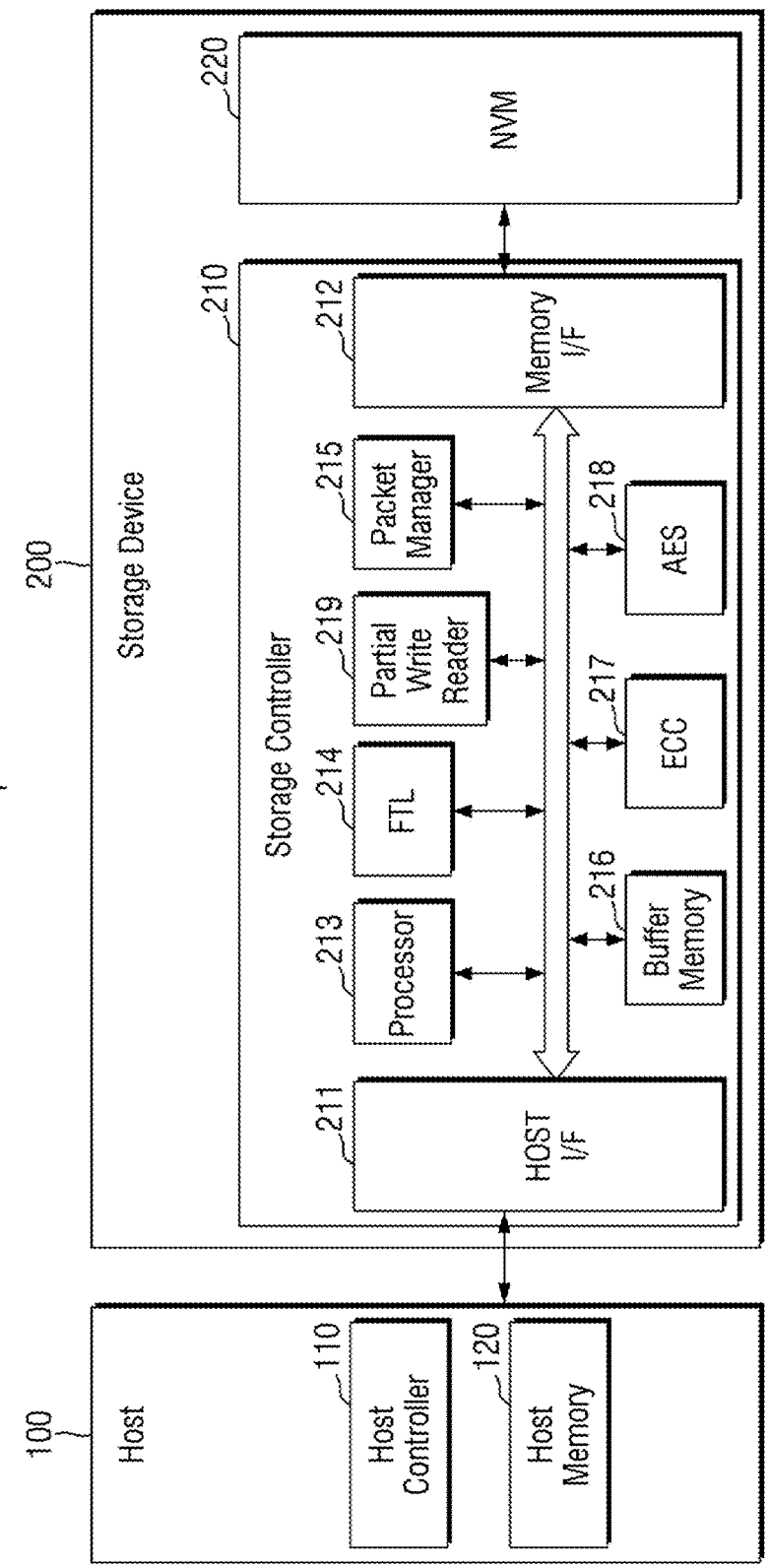
FIG. 1 is a block diagram showing a memory system according to some example embodiments.

FIG. 1 is a block diagram showing a memory system according to some example embodiments.

The memory system 10 may include a host device 100 and a storage device 200. Further, the storage device 200 may include a storage controller 210 and a nonvolatile memory (NVM) 220. Also, in some example embodiments, the host device 100 may include a host controller 110 and a host memory 120. The host memory 120 may function as a buffer memory for temporarily storing the data to be transmitted to the storage device 200 or the data transmitted from the storage device 200.

The storage device 200 may include a storage medium (e.g., non-transitory computer readable storage medium) for storing data in response to a request from the host device 100. For example, the storage device 200 may include at least one of an SSD (Solid State Drive), an embedded memory, or a detachable external memory. When the storage device 200 is an SSD, the storage device 200 may be a device that complies with an NVMe (non-volatile memory express) standard.

If the storage device 200 is an embedded memory or an external memory, the storage device 200 may be a device that complies with a UFS (universal flash storage) or an eMMC (embedded multi-media card) standard. The host device 100 and the storage device 200 may each generate and transmit packets according to the adopted standard protocol.

When the nonvolatile memory 220 of the storage device 200 includes a flash memory, the flash memory may include a 2D NAND memory array or a 3D (or vertical) NAND (VNAND) memory array. As another example, the storage device 200 may also include various other types of nonvolatile memories. For example, a MRAM (Magnetic RAM), a spin-transfer torque MRAM, a conductive bridging RAM (CBRAM), a FeRAM (Ferroelectric RAM), a PRAM (Phase RAM), a resistive memory (Resistive RAM), and various other types of memories may be applied as the storage device 200.

In some example embodiments, the host controller 110 and the host memory 120 may be implemented as separate semiconductor chips. Alternatively, in some example embodiments, the host controller 110 and the host memory 120 may be integrated on the same semiconductor chip. As an example, the host controller 110 may be one of a plurality of modules provided in the application processor, and such an application processor may be implemented as a system on chip (SoC). Further, the host memory 120 may be an embedded memory provided inside the application processor, or a nonvolatile memory or a memory module placed outside the application processor.

As described herein, some or all of the host device 100 and/or any portions thereof (including, without limitation, any of the host controller 110, the host memory 120, or any combination thereof) may include, may be included in, and/or may be implemented by one or more articles (e.g., units, instances, etc.) of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. The processing circuitry may also include various types of nonvolatile memories, for example a MRAM (Magnetic RAM), a spin-transfer torque MRAM, a conductive bridging RAM (CBRAM), a FeRAM (Ferroelectric RAM), a PRAM (Phase RAM), a resistive memory (Resistive RAM), which may implement any portion of the host device 100 (e.g., host memory 120). In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of the host device 100 and/or any portions thereof, including the functionality and/or methods performed by some or all of the host controller 110, host memory 120, or any combination thereof.

The host controller 110 may manage an operation of storing the data of a buffer region (for example, write data) in the nonvolatile memory 220 or storing the data of the nonvolatile memory 220 (for example, read data) in the buffer region.

The storage controller 210 may include a host interface 211, a memory interface 212, and a processor 213. Also, the storage controller 210 may further include a flash translation layer (FTL) 214, a packet manager 215, a buffer memory 216, an ECC (error correction code, 217) engine, and an AES (advanced encryption standard, 218) engine.

As described herein, some or all of the storage device 200, storage controller 210, and/or the nonvolatile memory 220 and/or any portions thereof (including, without limitation, any of the host interface 211, the memory interface 212, the processor 213, the FTL 214, the packet manager 215, the buffer memory 216, the ECC 217, the AES 218, the partial write reader 219, control logic circuit 510, memory cell array 520, page buffer unit 550, voltage generator 530, row decoder 540, or any combination thereof) may include, may be included in, and/or may be implemented by one or more articles (e.g., units, instances, etc.) of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. The processing circuitry may also include various types of nonvolatile memories, for example a MRAM (Magnetic RAM), a spin-transfer torque MRAM, a conductive bridging RAM (CBRAM), a FeRAM (Ferroelectric RAM), a PRAM (Phase RAM), a resistive memory (Resistive RAM), which may implement at least a portion of the storage device 200 (including without limitation any of the nonvolatile memory 220, the storage controller 210, the FTL 214, the buffer memory 216, the ECC 217, the AES 218, memory cell array 520, page buffer unit 550, or any combination thereof). In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/or methods performed by some or all of the storage device 200 and/or any portions thereof, including the functionality and/or methods performed by some or all of the nonvolatile memory 220 and/or storage controller 210 (including without limitation the functionality and/or methods performed by any of the host interface 211, the memory interface 212, the processor 213, the FTL 214, the packet manager 215, the buffer memory 216, the ECC 217, the AES 218, the partial write reader 219, control logic circuit 510, memory cell array 520, page buffer unit 550, voltage generator 530, row decoder 540, or any combination thereof).

The storage controller 210 may further include a working memory (not shown) into which the flash translation layer (FTL) 214 is loaded, and when the processor 213 executes the flash translation layer FTL 214, the data write and read operations of the nonvolatile memory 220 may be controlled.

The host interface 211, which may be a wireless or wired communication interface and/or transceiver (e.g., a wireless network communication transceiver), may transmit and receive packets (e.g., data packets containing data) to and from the host device 100. The packets transmitted from the host device 100 to the host interface 211 may include a command, data to be written in the nonvolatile memory 220, or the like. The packets transmitted from the host interface 211 to the host device 100 may include a response to the command, data that is read from the nonvolatile memory 220 or the like. For example, the host interface 211 may be configured to receive to receive a write command from the host device 100, where the write command including a command to write first data to a first address. As described herein, the "first data" may have a first size (e.g., a particular first size in units of bytes).

The memory interface 212 may transmit the data to be written in the nonvolatile memory 220 to the nonvolatile memory 220 or receive the read data from the nonvolatile memory 220. Such a memory interface 212 may be implemented to comply with standard protocols such as Toggle or ONFI.

The flash translation layer FTL 214 may perform various functions such as address mapping, wear-leveling, and garbage collection. The address mapping operation is an operation of changing a logical address received from a host into a physical address which is used for actually storing the data in the nonvolatile memory 220. The wear-leveling is a technique for ensuring that blocks in the nonvolatile memory 220 are used uniformly to prevent an excessive degradation of a particular block, and may be implemented, for example, through a firmware technique for balancing the erasure counts of the physical blocks. The garbage collection is a technique for ensuring an available capacity in the nonvolatile memory 220 through a method of copying the valid data of the block to a new block and then erasing the existing block.

The packet manager 215 may generate a packet according to the protocol of the interface discussed with the host device 100, or may parse various types of information from the packet received from the host device 100. Further, the buffer memory 216 may temporarily store the data to be recorded in the nonvolatile memory 220 or the data to be read from the nonvolatile memory 220. The buffer memory 216 may be configured to be provided inside the storage controller 210, but may be placed outside the storage controller 210.

The ECC engine (ECC 217) may perform error detection and correction functions of the read data that is read from the nonvolatile memory 220. More specifically, the ECC engine (ECC 217) may generate parity bits for the write data to be written on the nonvolatile memory 220, and the parity bits thus generated may be stored in the nonvolatile memory 220 together with the write data. When reading the data from the nonvolatile memory 220, the ECC engine (ECC 217) may correct an error of the read data and output the read data with a corrected error, using the parity bits that are read from the nonvolatile memory 220, together with the read data.

The AES engine (AES 218) may perform at least one of encryption and decryption operations of the data which is input to the storage controller 210, using a symmetric-key algorithm.

A partial write reader 219 may determine whether a write command received from the host device 100 is a partial write command (e.g., that the write command is a command to write first data to a first address of the nonvolatile memory 220 where the first data has a first size that is smaller than a mapping size of data stored by the nonvolatile memory 220, as described herein). If the write command received from the host device 100 is a partial write command (e.g., in response to determining that the first size of the first data commanded to be written by the write command is smaller than the mapping size), the partial write reader 219 may apply the read command to the nonvolatile memory 220 to perform the partial write. The partial write reader 219 may apply the read command to the nonvolatile memory 220 in response to processing the write command to determine that the first size of the first data commanded to be written by the write command is smaller than the mapping size, and the partial write reader 219 may apply the read command to the nonvolatile memory 220 before the commanded first data is actually received at the storage controller 210 from the host device 100 (e.g., before the storage controller 210 requests the commanded first data from the host device 100). In contrast, if the write command received from the host device 100 is not a partial write command, the partial write reader 219 does not apply the read command to the nonvolatile memory 220, and may allow the processor 213 to perform the write command.

In some example embodiments, the partial write reader 219 may be implemented in hardware and included in the storage controller 210. However, the example embodiments are not limited thereto, and the partial write reader 219 may also be implemented in software and executed by the processor 213.

The concept of the partial write command and the specific operation of the partial write readers 219 will be described below.

Figure 2:
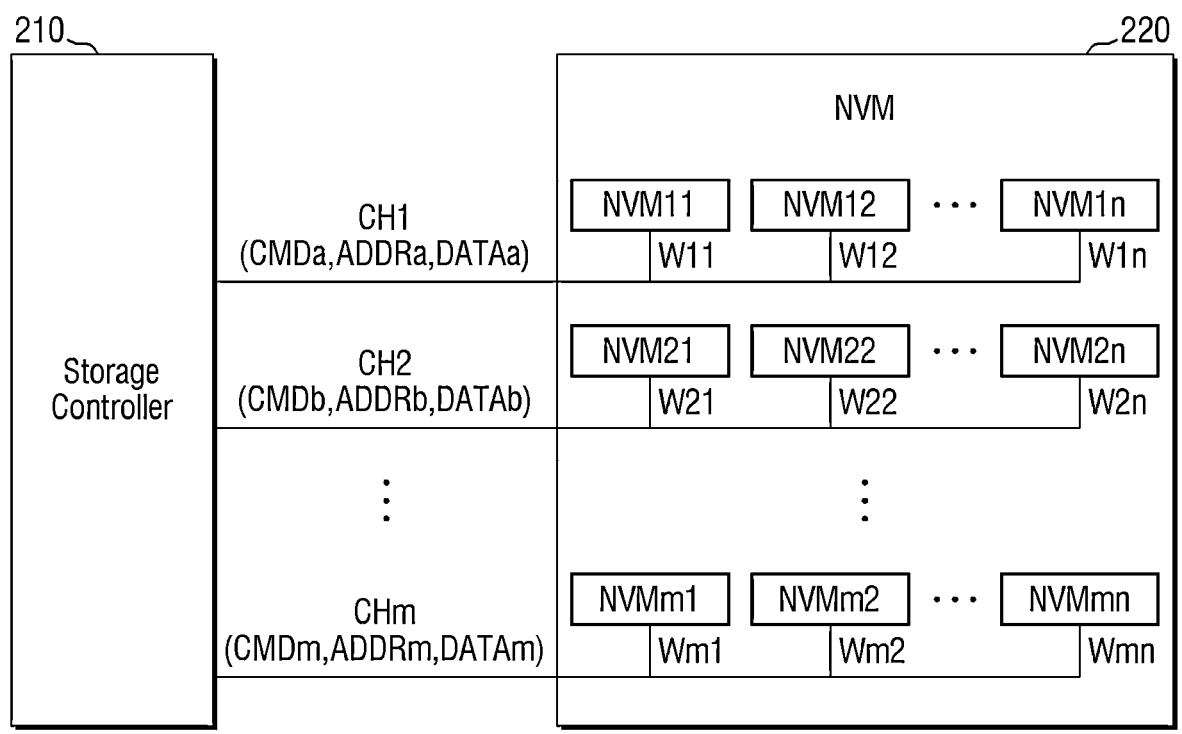
FIG. 2 is a diagram in which a storage controller of a storage device and a nonvolatile memory of FIG. 1 are reconfigured according to some example embodiments.

FIG. 2 is a diagram in which the storage controller 210 and the nonvolatile memory 220 of the storage device of FIG. 1 are reconfigured.

Referring to FIG. 2, the storage device 200 may include a nonvolatile memory 220 and a storage controller 210. The storage device 200 may support a plurality of channels CH1 to CHm, and the nonvolatile memory 220 and the storage controller 210 may be connected through the plurality of channels CH1 to CHm. For example, the storage device 200 may be implemented as a storage device such as an SSD (Solid State Drive).

The nonvolatile memory 220 may include a plurality of nonvolatile memory devices NVM11 to NVMmn, where "m" and "n" may each be any positive integer. Each of the nonvolatile memory devices NVM11 to NVMmn may be connected to one of the plurality of channels CH1 to CHm through corresponding conduits (e.g., wires, conductive paths, etc.). For example, the nonvolatile memory devices NVM11 to NVM1$n$ are connected to a first channel CH1 through the ways W11 to W1$n$, and the nonvolatile memory devices NVM21 to NVM2n may be connected to a second channel CH2 through the ways W21 to W2n. In some example embodiments, each of the nonvolatile memory devices NVM11 to NVMmn may be implemented in an arbitrary memory unit that may operate according to individual instructions from the storage controller 210. For example, although each of the nonvolatile memory devices NVM11 to NVMmn may be implemented as a chip or a die, the present inventive concepts are not limited thereto.

The storage controller 210 may transmit and receive signals to and from the nonvolatile memory 220 through the plurality of channels CH1 to CHm. For example, the storage controller 210 may transmit commands CMDa to CMDm, addresses ADDRa to ADDRm, and data DATAa to DATAm to the nonvolatile memory 220 through the channels CH1 to CHm, or may receive the data DATAa to DATAm from the nonvolatile memory 220.

The storage controller 210 may select one of the nonvolatile memory devices connected to the channel through each channel, and may transmit and receive signals to and from the selected nonvolatile memory device. For example, the storage controller 210 may select the nonvolatile memory device NVM11 among the nonvolatile memory devices NVM11 to NVM1n connected to the first channel CH1. The storage controller 210 may transmit command CMDa, address ADDRa, and data DATAa to the selected nonvolatile memory device NVM11 through the first channel CH1, or may receive the data DATAa from the selected nonvolatile memory device NVM11.

The storage controller 210 may transmit and receive signals in parallel to and from the nonvolatile memory 220 through different channels from each other. For example, the storage controller 210 may transmit a command CMDb to the nonvolatile memory 220 through the second channel CH2, while transmitting a command CMDa to the nonvolatile memory 220 through the first channel CH1. For example, the storage controller 210 may receive the data DATAb from the nonvolatile memory 220 through the second channel CH2, while receiving the data DATAa from the nonvolatile memory 220 through the first channel CH1.

The storage controller 210 may control the overall operation of the nonvolatile memory 220. The storage controller 210 may transmit the signal to the channels CH1 to CHm to control each of the nonvolatile memory devices NVM11 to NVMmn connected to the channels CH1 to CHm. For example, the storage controller 210 may transmit the command CMDa and the address ADDRa to the first channel CH1 to control selected one among the nonvolatile memory devices NVM11 to NVM1n.

Each of the nonvolatile memory devices NVM11 to NVMmn may operate according to the control of the storage controller 210. For example, the nonvolatile memory device NVM11 may program the data DATAa in accordance with the command CMDa, the address ADDRa, and the data DATAa provided to the first channel CH1. For example, the nonvolatile memory device NVM21 may read the data DATAb in accordance with the command CMDb and the address ADDRb provided to the second channel CH2, and transmit the read data DATAb to the storage controller 210.

Although FIG. 2 shows that the nonvolatile memory 220 communicates with the storage controller 210 through m channels, and the nonvolatile memory 220 includes n nonvolatile memory devices corresponding to each channel, the number of channels and the number of nonvolatile memory devices connected to one channel may be variously changed.

Figure 3:
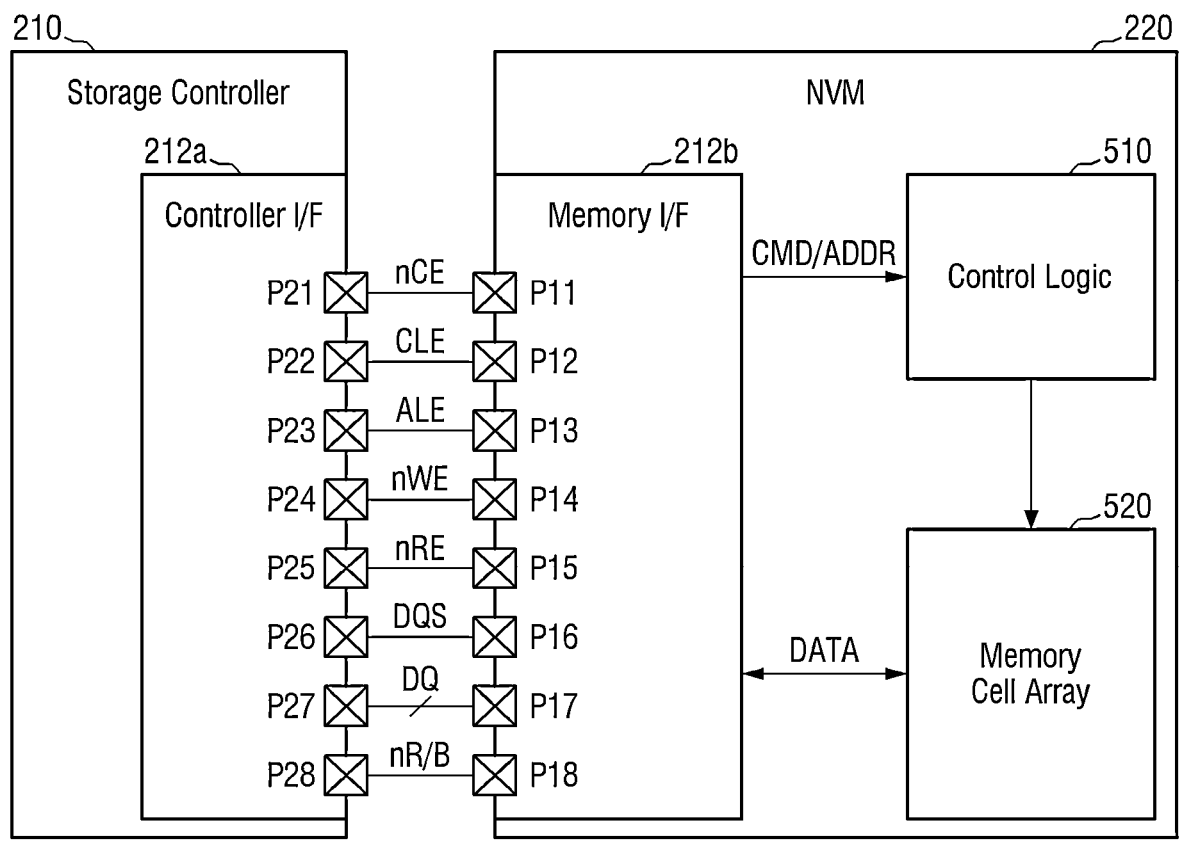
FIG. 3 is a diagram in which the storage controller, a memory interface, and nonvolatile memory of FIG. 1 are reconfigured according to some example embodiments.

FIG. 3 is a diagram in which the storage controller 210, the memory interface 212, and the nonvolatile memory 220 of FIG. 1 are reconfigured. The memory interface 212 of FIG. 1 may include a controller interface circuit 212a of FIG. 3.

The nonvolatile memory 220 may include first to eight pins P11 to P18, a memory interface circuit 212b, a control logic circuit 510, and a memory cell array 520.

The memory interface circuit 212b may receive a chip enable signal nCE from the storage controller 210 through a first pin P11. The memory interface circuit 212b may transmit and receive signals to and from the storage controller 210 through second to eighth pins P12 to P18 according to the chip enable signal nCE. For example, when the chip enable signal nCE is in an enable state (e.g., a low level), the memory interface circuit 212b may transmit and receive signals to and from the storage controller 210 through second to eighth pins P12 to P18.

The memory interface circuit 212b may receive a command latch enable signal CLE, an address latch enable signal ALE, and a write enable signal nWE from the storage controller 210 through the second to fourth pins P12 to P14. The memory interface circuit 212b may receive a data signal DQ from the storage controller 210 or transmit the data signal DQ to the storage controller 210 through a seventh pin P17. The command CMD, the address ADDR, and the data may be transferred through the data signal DQ. For example, the data signal DQ may be transferred through a plurality of data signal lines. In this case, the seventh pin P17 may include a plurality of pins corresponding to the plurality of data signals.

The memory interface circuit 212b may acquire the command CMD from the data signal DQ received in an enable section (e.g., a high level state) of the command latch enable signal CLE on the basis of the toggle timings of the write enable signal nWE. The memory interface circuit 212b may acquire the address ADDR from the data signal DQ received in the enable section (e.g., a high level state) of the address latch enable signal ALE on the basis of the toggle timings of the write enable signal nWE.

In some example embodiments, the write enable signal nWE holds a static state (e.g., a high level or a low level) and then may be toggled between the high level and the low level. For example, the write enable signal nWE may be toggled at the section in which the command CMD or the address ADDR is transmitted. Accordingly, the memory interface circuit 212b may acquire the command CMD or the address ADDR on the basis of the toggle timings of the write enable signal nWE.

The memory interface circuit 212b may receive a read enable signal nRE from the storage controller 210 through a fifth pin P15. The memory interface circuit 212b may receive the data strobe signal DQS from the storage controller 210 through a sixth pin P16, or may transmit the data strobe signal DQS to the storage controller 210.

In a data DATA output operation of the nonvolatile memory 220, the memory interface circuit 212b may receive the toggled read enable signal nRE through the fifth pin P15 before outputting the data DATA. The memory interface circuit 212b may generate the toggled data strobe signal DQS on the basis of toggling of the read enable signal nRE. For example, the memory interface circuit 212b may generate the data strobe signal DQS that starts to toggle after a predetermined delay (e.g., tDQSRE) on the basis of the toggling start time of the read enable signal nRE. The memory interface circuit 212b may transmit a data signal DQ including the data DATA on the basis of the toggle timing of the data strobe signal DQS. Accordingly, the data DATA may be arranged at the toggle timing of the data strobe signal DQS and transmitted to the storage controller 210.

In a data DATA input operation of the nonvolatile memory 220, when the data signal DQ including the data DATA is received from the storage controller 210, the memory interface circuit 212b may receive the toggled data strobe signal DQS together with the data DATA from the storage controller 210. The memory interface circuit 212b may acquire the data DATA from the data signal DQ, on the basis of the toggle timing of the data strobe signal DQS. For example, the memory interface circuit 212b may acquire the data DATA, by sampling the data signal DQ at a rising edge and a falling edge of the data strobe signal DQS.

The memory interface circuit 212b may transmit a ready/busy output signal nR/B to the storage controller 210 through an eighth pin P18. The memory interface circuit 212b may transmit the state information of the nonvolatile memory 220 to the storage controller 210 through the ready/busy output signal nR/B. When the nonvolatile memory 220 is in a busy state (that is, when the internal operations of the nonvolatile memory 220 are being performed), the memory interface circuit 212b may transmit the ready/busy output signal nR/B indicating the busy state to the storage controller 210. When the nonvolatile memory 220 is in a ready state (i.e., the internal operations of the nonvolatile memory 220 are not performed or are completed), the memory interface circuit 212b may transmit the ready/busy output signal nR/B indicating the ready state to the storage controller 210.

For example, while the nonvolatile memory 220 reads the data DATA from the memory cell array 520 in response to a page read command, the memory interface circuit 212b may transmit the ready/busy output signal nR/B indicating the busy state (e.g., a low level) to the storage controller 210. For example, while the nonvolatile memory 220 programs the data DATA into the memory cell array 520 in response to the program instruction, the memory interface circuit 212b may transmit the ready/busy output signal nR/B indicating the busy state to the storage controller 210.

The control logic circuit 510 may generally control various operations of the nonvolatile memory 220. The control logic circuit 510 may receive the command/address CMD/ADDR acquired from the memory interface circuit 212b. The control logic circuit 510 may generate control signals for controlling other components of the nonvolatile memory 220 according to the received command/address CMD/ADDR. For example, the control logic circuit 510 may generate various control signals for programing the data DATA in the memory cell array 520 or reading the data DATA from the memory cell array 520.

The memory cell array 520 may store the data DATA acquired from the memory interface circuit 212b according to the control of the control logic circuit 510. The memory cell array 520 may output the stored data DATA to the memory interface circuit 212b according to the control of the control logic circuit 510.

The memory cell array 520 may include a plurality of memory cells. For example, the plurality of memory cells may be flash memory cells. However, the present inventive concepts are not limited thereto, and the memory cells may be a RRAM (Resistive Random Access Memory) cell, a FRAM (Ferroelectric Random Access Memory) cell, a PRAM (Phase Change Random Access Memory) cell, a TRAM (Thyristor Random Access Memory) cell, and a MRAM (Magnetic Random Access Memory) cell. Hereinafter, embodiments of the present inventive concepts will be described with a focus on some example embodiments in which the memory cells are NAND flash memory cells.

The storage controller 210 may include first to eighth pins P21 to P28, and a controller interface circuit 212a. The first to eighth pins P21 to P28 may correspond to the first to eighth pins P11 to P18 of the nonvolatile memory 220.

The controller interface circuit 212a may transmit the chip enable signal nCE to the nonvolatile memory 220 through a first pin P21. The controller interface circuit 212a may transmit and receive signals to and from the nonvolatile memory 220, which is selected through the chip enable signal nCE, through the second to eighth pins P22 to P28.

The controller interface circuit 212a may transmit the command latch enable signal CLE, the address latch enable signal ALE, and the write enable signal nWE to the nonvolatile memory 220 through the second to fourth pins P22 to P24. The controller interface circuit 212a may transmit the data signal DQ to the nonvolatile memory 220 through a seventh pin P27 or receive the data signal DQ from the nonvolatile memory 220.

The controller interface circuit 212a may transmit the data signal DQ including the command CMD or the address ADDR, along with a toggled enable signal new, to the nonvolatile memory 220. The controller interface circuit 212a may transmit the data signal DQ including the command CMD to the nonvolatile memory 220 by transmitting the command latch enable signal CLE having the enable state, and may transmit the data signal DQ including the address ADDR to the nonvolatile memory 220 by transmitting the address latch enable signal ALE having the enable state.

The controller interface circuit 212a may transmit the read enable signal nRE to the nonvolatile memory 220 through a fifth pin P25. The controller interface circuit 212a may receive the data strobe signal DQS from the nonvolatile memory 220 through a sixth pin P26, or may transmit the data strobe signal DQS to the nonvolatile memory 220.

In the data DATA output operation of the nonvolatile memory 220, the controller interface circuit 212a may generate a toggled read enable signal nRE and transmit the read enable signal nRE to the nonvolatile memory 220. For example, the controller interface circuit 212a may generate the read enable signal nRE that changes from the static state (e.g., a high level or a low level) to the toggle state before the data DATA is output. Accordingly, the toggled data strobe signal DQS may be generated on the basis of the read enable signal nRE in the nonvolatile memory 220. The controller interface circuit 212a may receive the data signal DQ including the data DATA along with the toggled data strobe signal DQS, from the nonvolatile memory 220. The controller interface circuit 212a may acquire the data DATA from the data signal DQ on the basis of the toggle timing of the data strobe signal DQS.

In the data DATA input operation of the nonvolatile memory 220, the controller interface circuit 212a may generate a toggled data strobe signal DQS. For example, the controller interface circuit 212a may generate a data strobe signal DQS that changes from the static state (e.g., a high level or a low level) to the toggle state before transmitting the data DATA. The controller interface circuit 212a may transmit the data signal DQ including the data DATA to the nonvolatile memory 220 on the basis of the toggle timings of the data strobe signal DQS.

The controller interface circuit 212a may receive a ready/busy output signal nR/B from the nonvolatile memory 220 through an eighth pin P28. The controller interface circuit 212a may discriminate the state information of the nonvolatile memory 220 on the basis of the ready/busy output signal nR/B.

Figure 4:
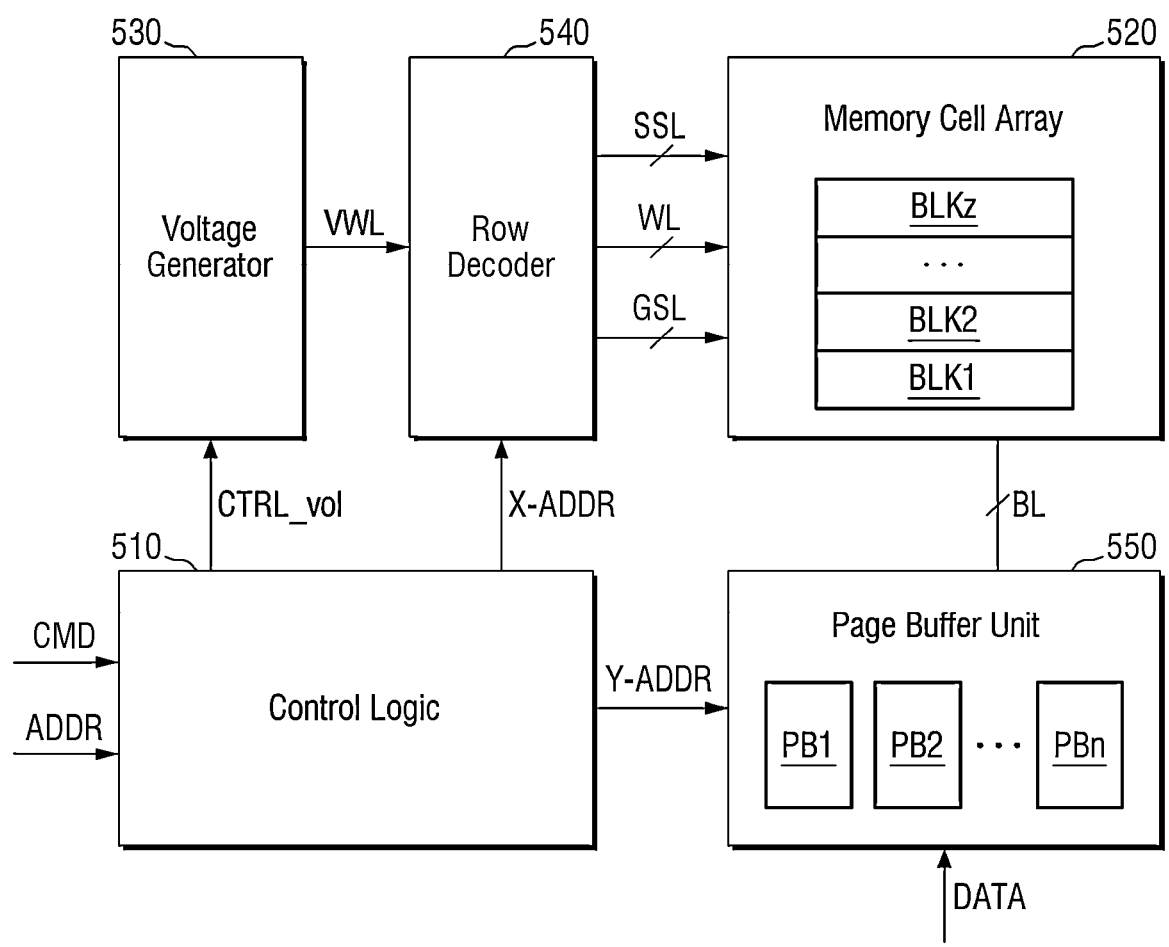
FIG. 4 is an example block diagram showing the nonvolatile memory of FIG. 3.

FIG. 4 is an example block diagram showing the nonvolatile memory of FIG. 3.

Referring to FIG. 4, the nonvolatile memory 220 may include a control logic circuit 510, a memory cell array 520, a page buffer unit 550, a voltage generator 530, and a row decoder 540. Although not shown in FIG. 4, the nonvolatile memory 220 may further include the memory interface circuit 212b shown in FIG. 3, and may further include a column logic, a pre-decoder, a temperature sensor, a command decoder, an address decoder, and the like, any or all of which may be included in, include, and/or be implemented by one or more articles of processing circuitry as described herein.

The control logic circuit 510 may generally control various operations inside the nonvolatile memory 220. The control logic circuit 510 may output various control signals in response to the command CMD and/or the address ADDR from the memory interface circuit (212b of FIG. 3). For example, the control logic circuit 510 may output a voltage control signal CTRL_vol, a row address X-ADDR, and a column address Y-ADDR.

The memory cell array 520 may include a plurality of memory blocks BLK1 to BLKz (z is a positive integer), and each of the plurality of memory blocks BLK1 to BLKz may include a plurality of memory cells. The memory cell array 520 may be connected to the page buffer unit 550 through the bit line BL, and may be connected to the row decoder 540 through word lines WL, string selection lines SSL, and ground selection lines GSL.

In some example embodiments, the memory cell array 520 may include a three-dimensional memory cell array, and the three-dimensional memory cell array may include a plurality of NAND strings. Each NAND string may include memory cells connected to word lines stacked vertically on the substrate. U.S. Pat. Nos. 7,679,133, 8,553,466, 8,654,587, 8,559,235, and U.S. Patent Application Publication No. 2011/0233648 are incorporated herein by reference. In some example embodiments, the memory cell array 520 may include a two-dimensional memory cell array, and the two-dimensional memory cell array may include a plurality of NAND strings placed along row and column directions.

The page buffer unit 550 may include a plurality of page buffers PB1 to PBn (n is an integer of three or more), and each of the plurality of page buffers PB1 to PBn may be connected to the memory cells through a plurality of bit lines BL. The page buffer unit 550 may select at least one bit line among the bit lines BL in response to the column address Y-ADDR. The page buffer unit 550 may operate as an entry driver or a detection amplifier, depending on the operating mode. For example, at the time of the program operation, the page buffer unit 550 may apply a bit line voltage corresponding to the data to be programmed to the selected bit line. At the time of the read operation, the page buffer unit 550 may detect the current or voltage of the selected bit line and detect the data stored in the memory cell.

The voltage generator 530 may generate various types of voltages for performing program, read, and erasure operations on the basis of the voltage control signal CTRL_vol. For example, the voltage generator 530 may generate a program voltage, a read voltage, a program verification voltage, an erasure voltage, and the like, as a word line voltage VWL.

The row decoder 540 may select one of a plurality of word lines WL in response to the row address X-ADDR, and select one of a plurality of string selection lines SSL. For example, the row decoder 540 may apply a program voltage and a program verification voltage to the selected word line at the time of the program operation, and may apply a read voltage to the selected word line at the time of the read operation.

Figure 5:
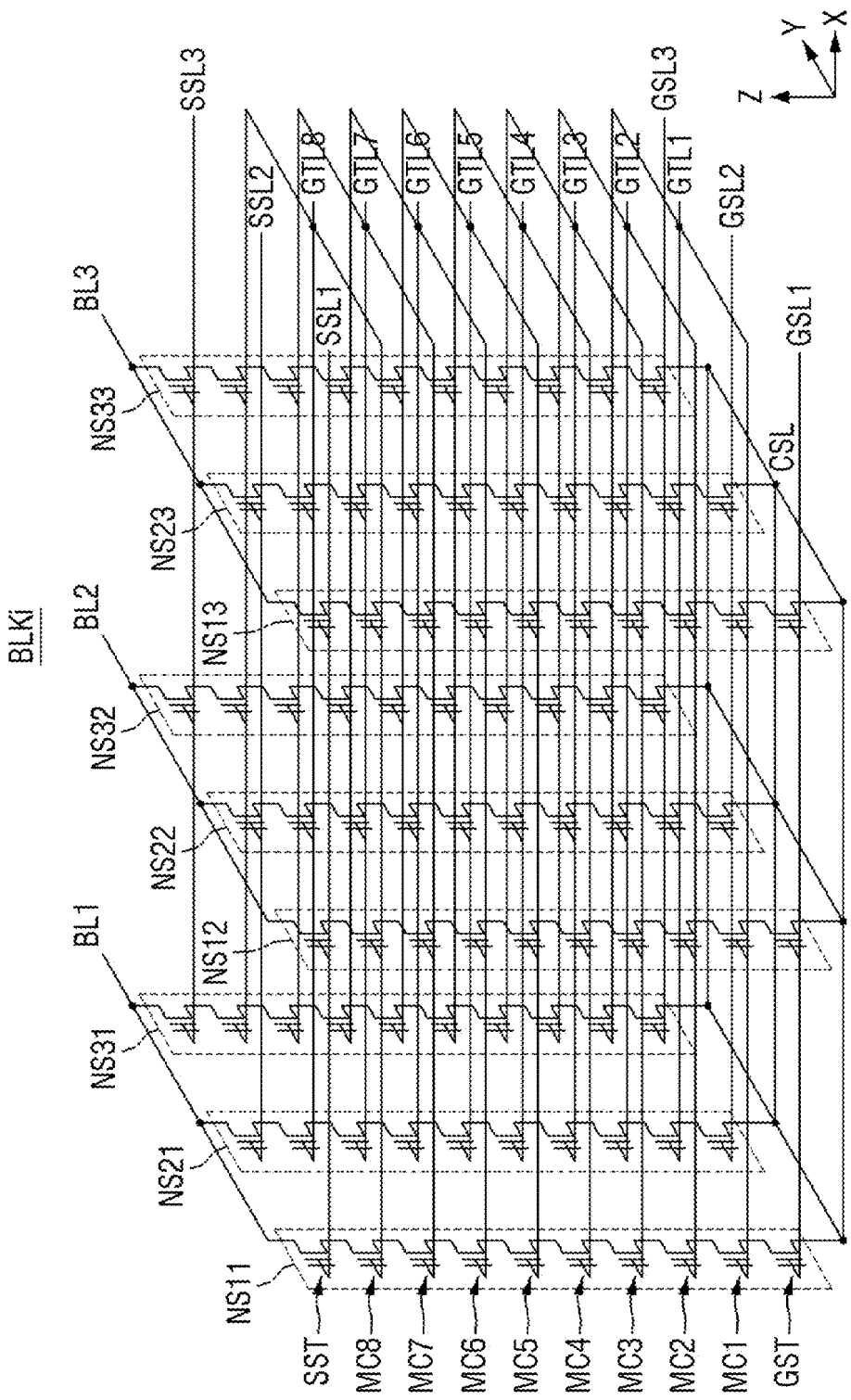
FIG. 5 is a diagram for explaining a 3D V-NAND structure that may be applied to the nonvolatile memory according to some example embodiments.

FIG. 5 is a diagram for explaining a 3D V-NAND structure that may be applied to the nonvolatile memory according to some example embodiments. When the storage module of the storage device is implemented as a 3D V-NAND type flash memory, each of the plurality of memory blocks constituting the storage module may be represented by an equivalent circuit as shown in FIG. 5.

A memory block BLKi shown in FIG. 5 shows a three-dimensional memory block formed in a three-dimensional structure on the substrate. For example, a plurality of memory NAND strings included in the memory block BLKi may be formed in a direction perpendicular to the substrate.

Figure 7:
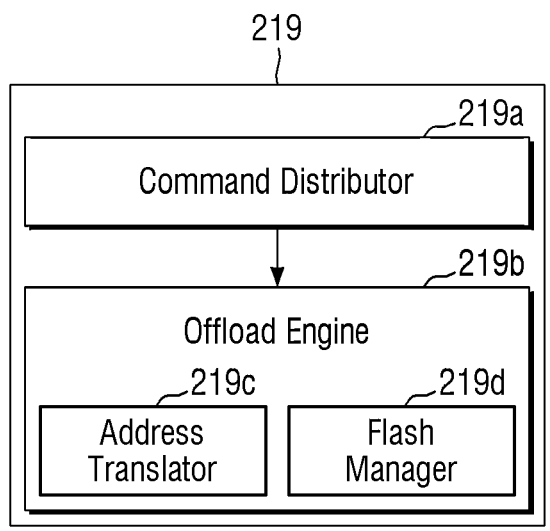
FIG. 7 is a block diagram of a partial write reader of FIG. 1 according to some example embodiments.

Referring to FIG. 5 the memory block BLKi may include a plurality of memory NAND strings NS11 to NS33 connected between the bit lines BL1, BL2, and BL3 and the common source line CSL. A plurality of memory NAND strings NS11 to NS33 may each include a string selection transistor SST, a plurality of memory cells MC1, MC2, . . . , and MC8, and a ground selection transistor GST. Although FIG. 7 shows that each of the plurality of memory NAND strings NS11 to NS33 includes eight memory cells MC1, MC2, . . . , MC8, the example embodiments are not necessarily limited thereto.

The string selection transistor SST may be connected the corresponding string selection lines SSL1, SSL2, and SSL3. The plurality of memory cells MC1, MC2, . . . , MC8 may each be connected to the corresponding gate lines GTL1, GTL2, . . . , and GTL8. The gate lines GTL1, GTL2, . . . , GTL8 may correspond to word lines, and some of the gate lines GTL1, GTL2, . . . , GTL8 may correspond to dummy word lines. The ground selection transistor GST may be connected to the corresponding ground selection lines GSL1, GSL2, and GSL3. The string selection transistor SST may be connected to the corresponding bit lines BL1, BL2, and BL3, and the ground selection transistor GST may be connected to the common source line CSL.

Figure 9:
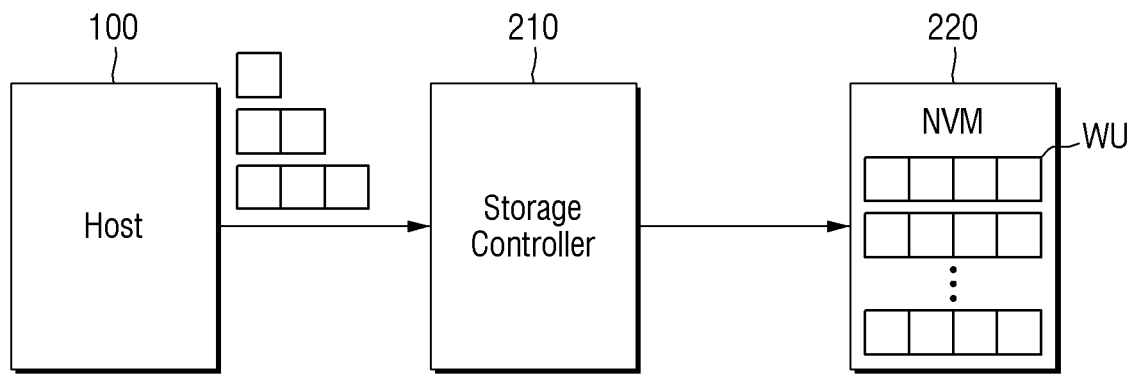

The word lines (e.g., WL1) of the same height are connected in common, and the ground selection lines GSL1, GSL2, and GSL3 and the string selection lines SSL1, SSL2, and SSL3 may be separated from each other. Although FIG. 9 shows that the memory block BLK is connected to eight gate lines GTL1, GTL2, . . . , and GTL8 and three bit lines BL1, BL2, and BL3, the example embodiments are not necessarily limited thereto.

Figure 6:
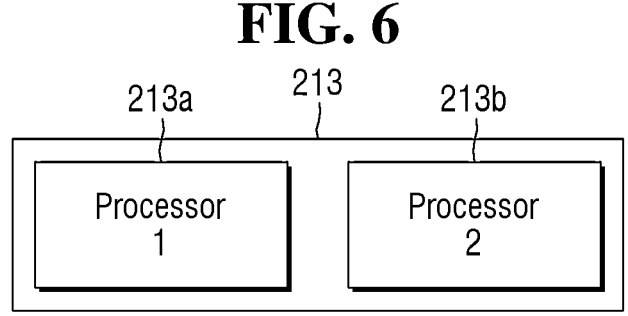
FIG. 6 is a block diagram of a processor of FIG. 1 according to some example embodiments.

FIG. 6 is a block diagram of the processor of FIG. 1.

Referring to FIGS. 1 and 6, a processor 213 (e.g., an article of processing circuitry that implements at least the processor 213) may include a first processor 213a and a second processor 213b. The first and second processors 213a and 213b may be implemented by separate articles of processing circuitry, for example separate CPUs, or may be implemented by a single article of processing circuitry.

The first processor 213a may request and receive data (e.g., first data as described herein) from the host device 100 to perform a write operation in response to the write command being provided (e.g., transmitted) from the host device 100 and received from the host device 100 at the storage controller 210. Further, the first processor 213a may store the data received from the host device 100 (e.g., first data as described herein) in the buffer memory 216 (e.g., in response to receiving the first data from the host device 100). In some example embodiments, the first processor 213a may include, but is not limited to, the host core.

The second processor 213b may write the data stored in the buffer memory 216 (e.g., first data and third data as described herein) to the nonvolatile memory 220 to perform the write command received from the host device 100. In some example embodiments, the second processor 213b may include, but is not limited to, a flash core.

Figure 8:
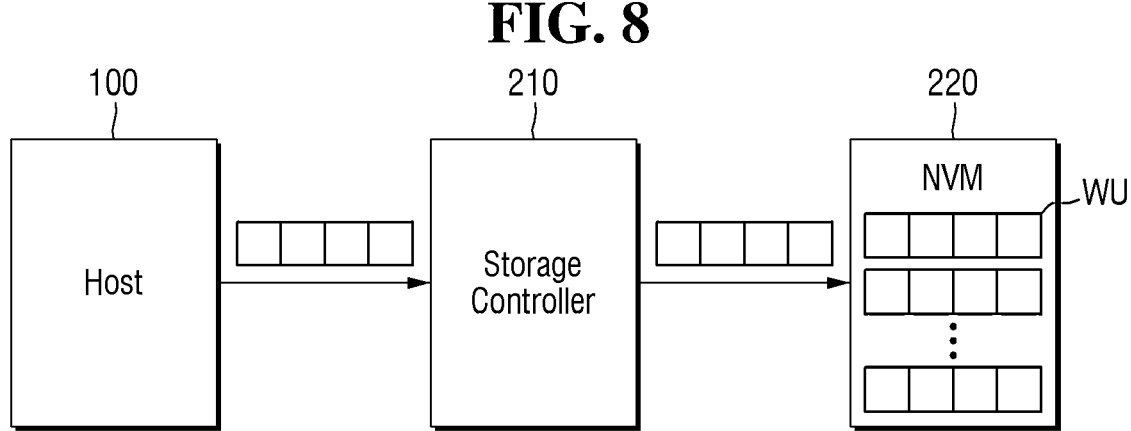
FIGS. 8 and 9 are diagrams for explaining the function of a command distributer of FIG. 7 according to some example embodiments.

FIG. 7 is a block diagram of the partial write reader of FIG. 1 according to some example embodiments. FIGS. 8 and 9 are diagrams for explaining the function of the command distributer of FIG. 7 according to some example embodiments.

Referring to FIGS. 1 and 7, the partial write reader 219 may include a command distributor 219a and an offload engine 219b.

The command distributor 219a may determine whether the write command received from the host device 100 is a partial write command. Here, the partial write command means a write command for data of a size smaller than a storage unit (mapping size unit, also referred to as mapping size) of the nonvolatile memory 220. As described herein, the nonvolatile memory 220 may be configured to store data that is written in size units having a size corresponding to (e.g., a size that is or is an integer multiple of) a particular mapping size unit (e.g., a mapping size unit that is four write units WU and is 4096 bytes). For example, the nonvolatile memory 220 may be configured to store data that is written in size units of (e.g., is written in a size that is or is an integer multiple of) a mapping size. As described herein, where a host interface 211 of the storage controller 210 receives a write command from the host device 100, where the write command includes a command to write first data to a first address, and the first data has a first size smaller than the mapping size in data stored by the nonvolatile memory 220 is written, the write command may be referred to as a partial write command.

For example, referring to FIG. 8, when the nonvolatile memory 220 stores the data in four write units WU (where a write unit WU is a particular unit of size, or amount, of data), the mapping size in which data that is stored by the nonvolatile memory 220 is stored may be equal to four write units WU. If the write command having the size of the four write units WU (e.g., a write command to write data having a size of four write units) is applied from the host device 100, this is not a partial write command.

For example, when one write unit WU is 1024 bytes, the nonvolatile memory 220 stores data in units (e.g., size units) of 4096 bytes (mapping size), and if the write command of writing the data having a size (e.g., data size) of 4096 bytes (e.g., the data to be written has the size of 4096 bytes) is applied from the host device 100, this is not a partial write command. Here, although the mapping size of the nonvolatile memory 220 is shown to 4096 bytes as an example, this is merely an example, and the example embodiments are not limited thereto. The mapping size of the nonvolatile memory 220 may be variously modified to 1024 bytes, 2048 bytes, 8192 bytes, and the like.

In this way, when a write command of writing the data of the same size as the mapping size of the nonvolatile memory 220 is received from the host device 100, the storage controller 210 may write the data provided (e.g., transmitted) from the host device 100 to the nonvolatile memory 220 as it is (e.g., without being partitioned into two separate pieces of data, without being combined with other data, etc.). It will be understood that the storage controller 210 is thus configured to provide (e.g., transmit) commands to the nonvolatile memory 220. It will be understood that, as described herein, "providing" a command, data, or the like to a device may be referred to interchangeably as "transmitting" the command, data, or the like to the device.

Incidentally, referring to FIG. 9, when the write command having the size of one, two, or three write units WU (e.g., a write command to write data that has a size of one, two, or three write units WU) is applied from the host device 100, this is a partial write command.

That is, when the write command having the size of 1024 bytes (e.g., write command to write data that has the size of 1024 bytes) is applied from the host device 100, the write command having the size of 2048 bytes (e.g., write command to write data that has the size of 2048 bytes) is applied, or the write command having the size of 3072 bytes (e.g., write command to write data that has the size of 3072 bytes) is applied, this is a partial write command.

Referring to FIGS. 1, 6 and 7, the command distributor 219a determines whether the write command received from the host device 100 is a partial write command that needs to write the data having the size smaller than the mapping size of the nonvolatile memory 220. For example, the command distributor 219a may determine whether a first size, of a first data that a write command is commanding to be written to a first address of the nonvolatile memory 220, is smaller than the mapping size at which data is stored at the nonvolatile memory 220.

If the write command is not a partial write command, the command distributor 219a gives only the first processor 213a orders to request data from the host device 100 for data reception from the host device 100.

In some example embodiments, if the write command is a partial write command (e.g., the first data commanded to be written by the write command has a first size that is smaller than the mapping size), the command distributor 219a gives the first processor 213a orders to request the data from the host device 100 for data reception from the host device 100, and gives the offload engine 219b orders that the data read is required for the partial write. Accordingly, the command distributor 219a may be understood to determine whether the "first size" of the first data commanded to be written by the write command is smaller than the mapping size of the nonvolatile memory 220, and the offload engine 219b may be understood to be configured to selectively provide (e.g., transmit) a read command to the nonvolatile memory 220 based on an output of the determination of whether the first size is smaller than the mapping size. A more specific description thereof will be provided below.

Referring to FIGS. 1 and 7, the offload engine 219b may include an address translator 219c and a flash manager 219d.

The address translator 219c may search the physical address of the nonvolatile memory 220 corresponding to the logical address received from the host device 100, for example, by referring to the mapping table stored in the FTL 214. The FTL may be configured to store a mapping table in which physical address (e.g., a second address) of the nonvolatile memory 220 is stored, where the second address corresponds to the logical address (e.g., a first address to which the first data commanded to be written by the write command from the host device 100 is commanded to be written). The address translator 219c may search the "second address" based on referring to the mapping table stored in the FTL 214.

The flash manager 219d may apply the read command, which reads the data of the nonvolatile memory 220 addressed to the physical address searched from the address translator 219c, to the nonvolatile memory 220. The flash manager 219*d* may provide (e.g., transmit) the read command to the nonvolatile memory 220 (e.g., cause the read command provided by the partial write reader 219 to be transmitted in response to determining that the first size of the first data commanded to be written by the write command is smaller than the mapping size of the nonvolatile memory 220) using the second address that has been searched.

In some example embodiments, such a flash manager 219*d* is implemented separately from the processor 213, and may apply the read command to the nonvolatile memory 220, without using the processor 213. That is, in some example embodiments, the flash manager 219*d* and the processor 213 may apply the read command to the nonvolatile memory 220 independently of each other.

Hereinafter, the operation of the storage device 200 will be described more specifically referring to FIGS. 10 and 11. It will be understood that any of the operations as described herein, including without limitation any of the operations according to any of the figures, may be performed by any portion of the memory system 10 according to any of the example embodiments, including any portion of the storage controller 210 (and including any processing circuitry implementing any portion of the storage controller 210) according to any of the example embodiments.

Figure 10:
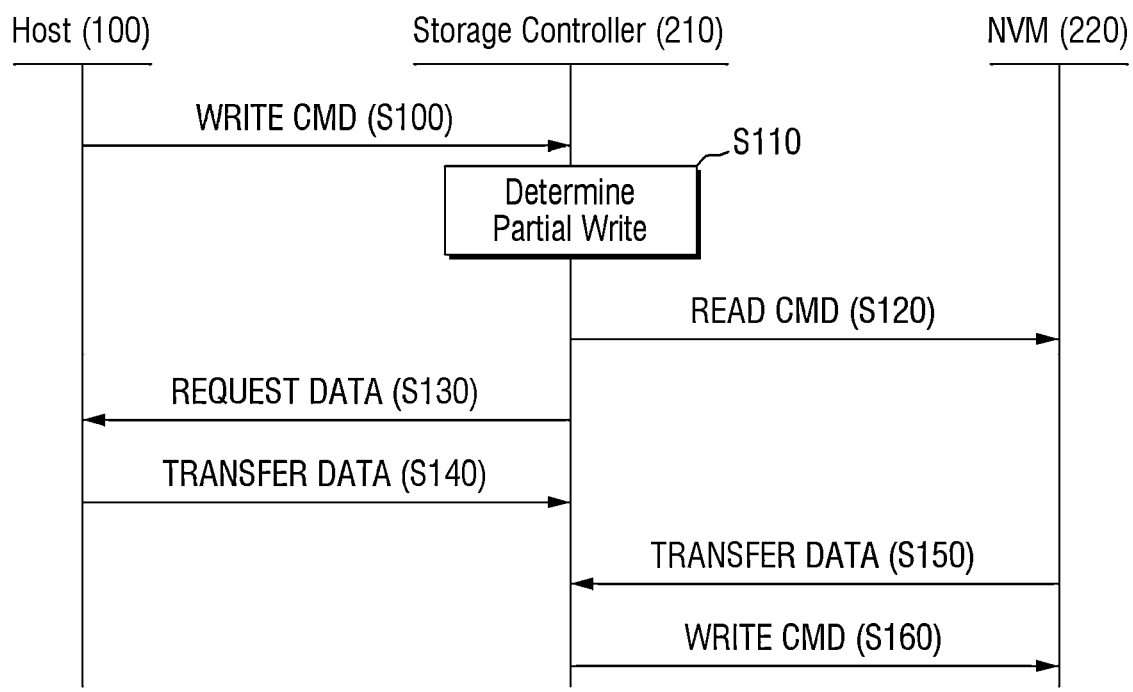
FIGS. 10 and 11 are diagrams for explaining the operation of the storage device according to some example embodiments.
Figure 11:
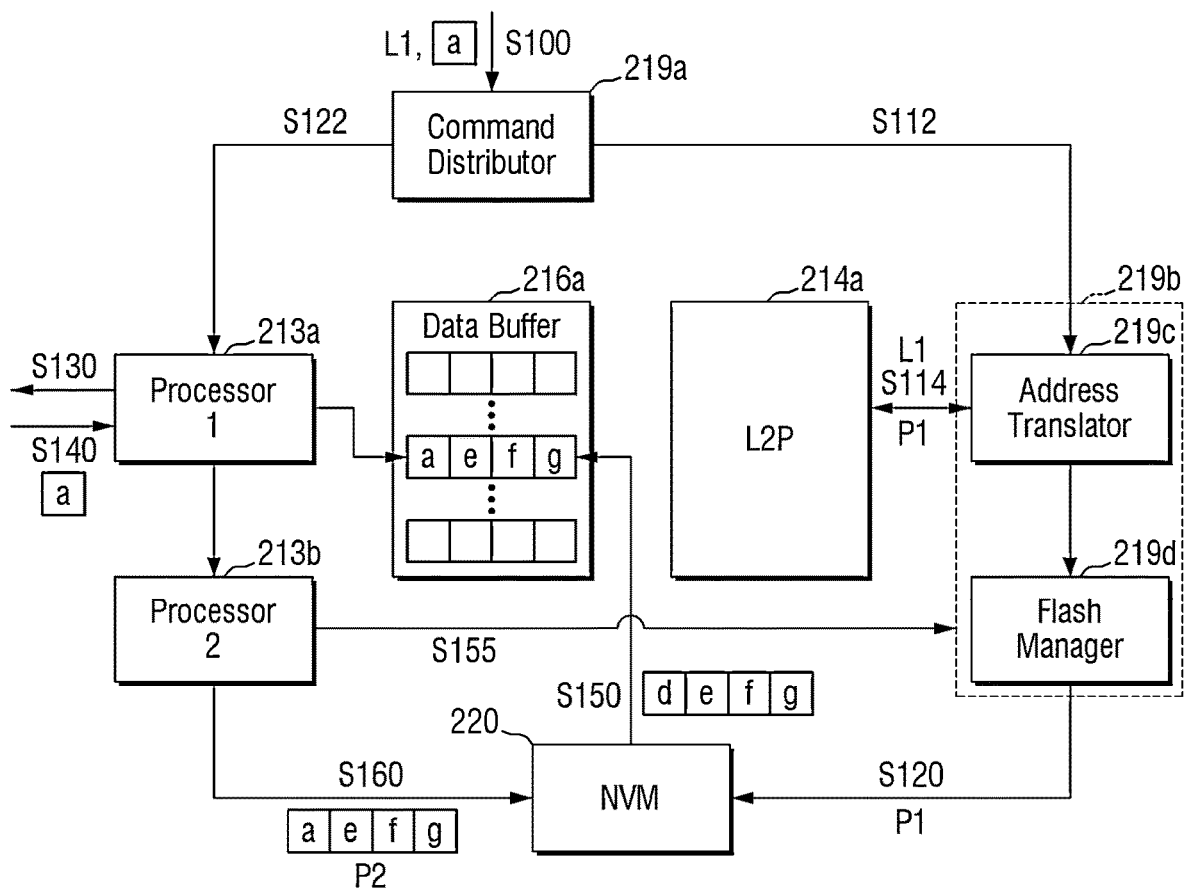

FIGS. 10 and 11 are diagrams for explaining the operation of the storage device according to some example embodiments.

Referring to FIGS. 1, 10 and 11, the storage controller 210 receives the write command from the host device 100 (S100). The write command may be a command to write first data having a first size to a first address (e.g., physical address) of the nonvolatile memory 220.

The write command provided (e.g., transmitted) from the host device 100 may be provided (e.g., transmitted) to the command distributor 219*a* of the storage controller 210.

The command distributor 219*a* of the storage controller 210 determines whether the write command received from the host device 100 is a partial write command (S110) (e.g., determine whether the first size of the first data that is commanded to be written by the write command is smaller than the mapping size of the nonvolatile memory 220).

In some example embodiments, the storage controller 210 may selectively refrain from providing (e.g., transmitting) a read command to the nonvolatile memory 220 as described further below in response to a determination that the first size of the first data that is commanded to be written by the write command is a same size as (e.g., has an equal size to) the mapping size of the nonvolatile memory 220. For example, if the write command received from the host device 100 is not a partial write command, the command distributor 219*a* gives the first processor 213*a* orders to request the data from the host device 100 for the write operation of the nonvolatile memory 220, and in this case, the offload engine 219*b* does not operate.

Hereinafter, an example in which the mapping size of the nonvolatile memory 220 is four write units WU, but the write command received from the host device 100 gives orders to write 'a' corresponding to one write unit WU (and thus has a first size that is smaller than the mapping size) will be explained.

If the write command received from the host device 100 is a partial write command (e.g., in response to a determination at the storage controller 210 that the first data commanded to be written by the write command has a first size that is smaller than the mapping size of the nonvolatile memory 220), the command distributor 219*a* gives the offload engine 219*b* orders that the data read is required for the partial write (S112). If the write command is not a partial write command, the command distributor 219*a* selectively refrains from giving such orders to the offload engine 219*b*.

The address translator 219*c* of the offload engine 219*b* searches the physical address (e.g., second address) of the nonvolatile memory 220 on the basis of (e.g., based on) the logical address (e.g., first address) received through the write command (S114).

For example, when the write command received from the host device 100 gives the logical address L1 (e.g., first address) orders to write data a (e.g., first data), the address translator 219*c* of the offload engine 219*b* searches the physical address P1 (e.g., second address) of the nonvolatile memory 220 corresponding to the logical address L1, based on referring to the mapping table 214*a*.

In some example embodiments, the read command at S120 may include a command to read second data stored in the nonvolatile memory 220 addressed to the second address. The second data may have a size that is equal to the mapping size. The read command may be provided (e.g., transmitted) to the nonvolatile memory 220 via a memory interface 212 of the storage controller 210. in some example embodiments, although the mapping table 214*a* may be included in the FTL 214, the example embodiments are not limited thereto.

The flash manager 219*d* of the offload engine 219*b* applies the read command, which gives orders to read the data addressed to the physical address P1 (e.g., second data), to the nonvolatile memory 220 (S120).

As described above, in some example embodiments, the flash manager 219*d* applies the read command to the nonvolatile memory 220, without using the second processor 213*b* which executes the function of applying the commands to the nonvolatile memory 220 in the processor 213.

In some example embodiments, if the write command received from the host device 100 is a partial write command, the command distributor 219*a* gives the first processor 213*a* orders to request the data from the host device 100 for the write operation of the nonvolatile memory 220 (S122).

The storage controller 210 may provide (e.g., transmit) the read command to the nonvolatile memory 220 at S120 and then transmit a request signal to the host device to request the first data at S130, after the read command is provided (e.g., transmitted) to the nonvolatile memory at S120. The storage controller 210 may transmit a request signal to the host device 100 at S130, where the request signal may be transmitted through the host interface 211, to request the first data (e.g., data a) from the host device 100. For example, in some example embodiments, in response to providing (e.g., transmitting) the read command, the first processor 213*a* requests data (e.g., the first data) from the host device 100 (S130), and receives the data a (e.g., the first data) from the host device 100 (S140). The first processor 213*a* that has received the data a stores the data a (e.g., the first data) in the data buffer 216*a* (which may be included in the buffer memory 216). Further, the first processor 213*a* notifies the second processor 213*b* that the data a has been received.

Accordingly, as shown at FIGS. 10-11, when a write command that includes a command to write data of a first size to a logical address (e.g., first address) of the nonvolatile memory 220 is received at the storage controller 210 from the host device 100 at S100, the storage controller 210 may provide (e.g., transmit), at S120, the nonvolatile memory 220 (e.g., transmit to the nonvolatile memory 220) a read command to cause the nonvolatile memory 220 to read second data stored in the nonvolatile memory 220 addressed based on the first addresses in response to a determination, at S110, that the first size of the first data is smaller than the mapping size of the nonvolatile memory 220. As further shown in FIG. 10, the read command may be provided (e.g., transmitted) to the nonvolatile memory 220 at S120 prior to the first data actually being received at the storage controller 210 at S140.

In some example embodiments, although the data buffer 216a may be included in the buffer memory 216, the example embodiments are not limited thereto, and the data buffer 216a may also be placed outside the storage controller 210.

In response to the read command applied from the flash manager 219d, the data d, e, f, and g (e.g., second data) are read from the nonvolatile memory 220 (S150). The data d, e, f, and g that are read from the nonvolatile memory 220 and thus received at the storage controller 210 may be stored in the buffer memory 216. Here, the fact that there are four data is because the mapping size of the nonvolatile memory 220 is four write units WU, as described above. Accordingly, the second data that is caused to be read in response to the read command at S120 may have a second size that is equal to the mapping size of the nonvolatile memory 220. In some example embodiments, the nonvolatile memory 220 may provide (e.g., transmit) data d, e, f, and g to the storage controller 210 through the data input/output operation described above referring to FIG. 3.

The read data d, e, f, and g are stored in the data buffer 216a by the flash manager 219d. At this time, the flash manager 219d does not store all the data d, e, f, and g read in the data buffer 216a, but stores only the data e, f, and g in the data buffer 216a, by referring to a sector bitmap.

In some example embodiments, only a limited portion of the received second data (e.g., data e, f, g) may be stored in the data buffer 216a (which may be included in the buffer memory 216). The limited portion of the received second data that is stored in the data buffer 216a may be selected to have a size that is equal to a difference between the mapping size and the first size of the first data (e.g., data a), such that a sum of the first size and the size of the limited portion of the second data that is stored in the data buffer 216a may be equal to the mapping size. Data e, f, and g may be a third data that is stored in the data buffer 216a, where the third data (data e, f, g) is a limited portion of the second data (data d, e, f, g) that excludes a separation portion of the read second data that has a size that is equal to the first size (e.g., excludes data d that has an equal size as data a), such that the third data (e.g., data e, f, g) has a third size (e.g., three write units WU) that is equal to a difference between the mapping size (e.g., four write units WU) and the first size (e.g., one write unit WU).

For example, in some example embodiments, the flash manager 219d recognizes that one write unit WU among the four write units WU of the data buffer 216a is a region in which the data a received from the host device 100 is stored through the sector bitmap, and stores the data e, f, and g only in the remaining three write units WU.

Through such a process, data used to perform the partial write command received from the host device 100 without overwrite or data copying process is stored in the data buffer 216a. As shown in at least FIG. 11, the data buffer 216a (which may be included in the buffer memory 216) may be configured to store data in size units of the mapping size (e.g., four write units WU), and only some of the first data and the second data (e.g., data a and a limited portion of data d, e, f, and g that includes data e, f, and g but excludes data d) may be stored in the data buffer 216a to correspond to the mapping size (e.g., stored data a, e, f, and g has a combined size of four write units WU that is equal to the mapping size).

The second processor 213b checks whether the flash manager 219d prepares the data capable of performing the partial write (S155), and when there is a state in which the data preparation is completed, the second processor 213b applies the write command which gives orders to write the data a, e, f, and g at the position addressed to P2 of the nonvolatile memory 220 (S160). In some example embodiments, the storage controller 210 may provide (e.g., transmit) the data a, e, f, and g to the nonvolatile memory 220 through the data input/output operation described above referring to FIG. 3 above.

In this way, when the data a, e, f, and g are written to the position addressed to P2 of the nonvolatile memory 220, the physical address corresponding to the logical address L1 may be updated from P1 to P2 in the mapping table 214a.

Figure 12:
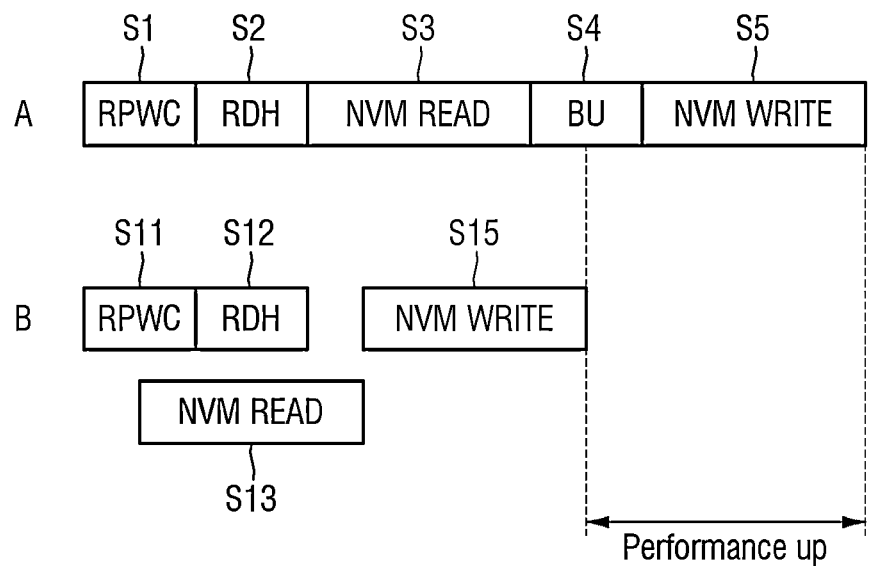
FIG. 12 is a diagram for explaining the effect of the storage device according to some example embodiments.

FIG. 12 is a diagram for explaining the effect of the storage device according to some example embodiments. A of FIG. 12 is a diagram showing the partial write operation of the storage controller (210 of FIG. 1) that does not include the partial write reader (219 of FIG. 1) described above, and B is a diagram showing the partial write operation of the storage controller (210 of FIG. 1) which does include the partial write reader (219 of FIG. 1) described above.

First, referring to A of FIG. 12, the storage controller receives the partial write command (S1), and requests and receives the partial write data (a of FIG. 11) from the host device (S2). Further, the storage controller reads the data stored in the nonvolatile memory (S3), and updates the data buffer with the read data (S4). After that, the storage controller performs the partial write operation on the nonvolatile memory (S5).

However, referring to B of FIG. 12, immediately after the storage controller receives the partial write command (S11), the read operation of the data stored in the nonvolatile memory is immediately performed (S13). Further, the operation (S12) of requesting and receiving the partial write data (a of FIG. 11) from the host device is performed independently of the read operation (S13) of the data stored in the nonvolatile memory and in parallel. Accordingly, the performance start time of the partial write operation (S15) performed for the nonvolatile memory is significantly shortened, and the completion time of the partial write operation (S15) is also shortened. Accordingly, the speed of the partial write operation of the storage device may be improved, and the operating performance of the storage device may be improved.

Figure 13:
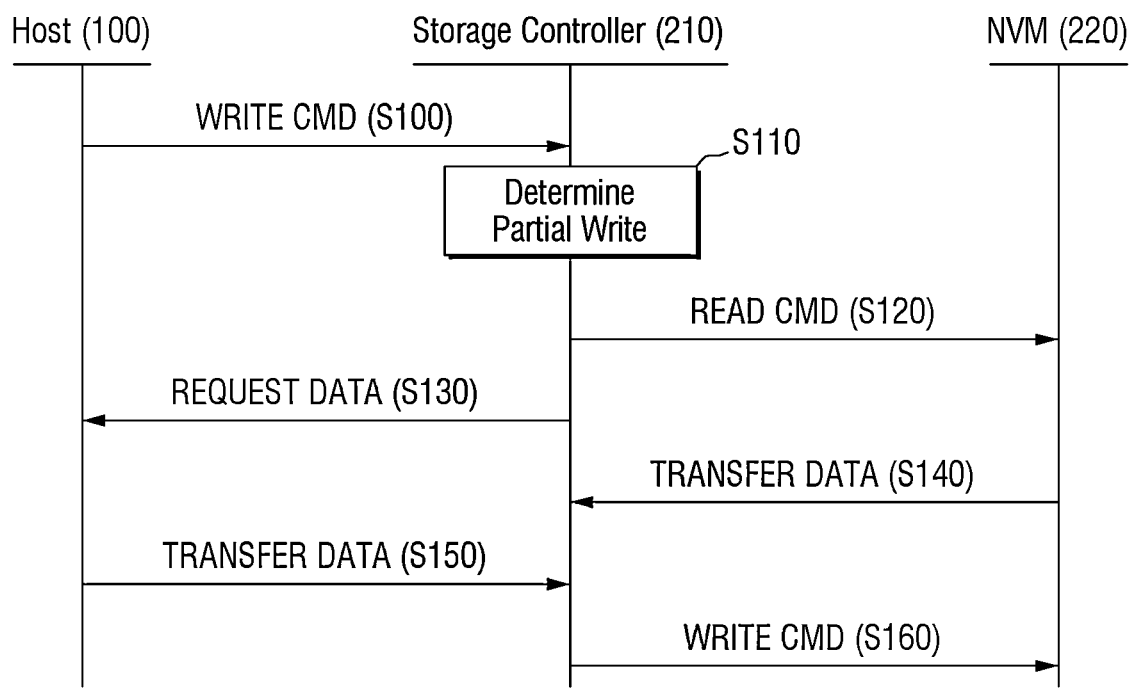
FIG. 13 is a diagram for explaining the operation of the storage device according to some example embodiments.

FIG. 13 is a diagram for explaining the operation of the storage device according to some example embodiments. Hereinafter, repeated description of the above-described example embodiments will not be provided, and the differences will be mainly described.

In some example embodiments, the second data may be received from the nonvolatile memory 220 at S140 before the storage controller 210 receives the first data at S150. For example, referring to FIG. 13, in some example embodiments, after the read data (d, e, f, and g of FIG. 10) is received from the nonvolatile memory 220 (S140), the data (a of FIG. 10) is received from the host device 100 (S150).

In this case, the data e, f, and g are stored in the data buffer 216a first, and the data a may be stored later.

Figure 14:
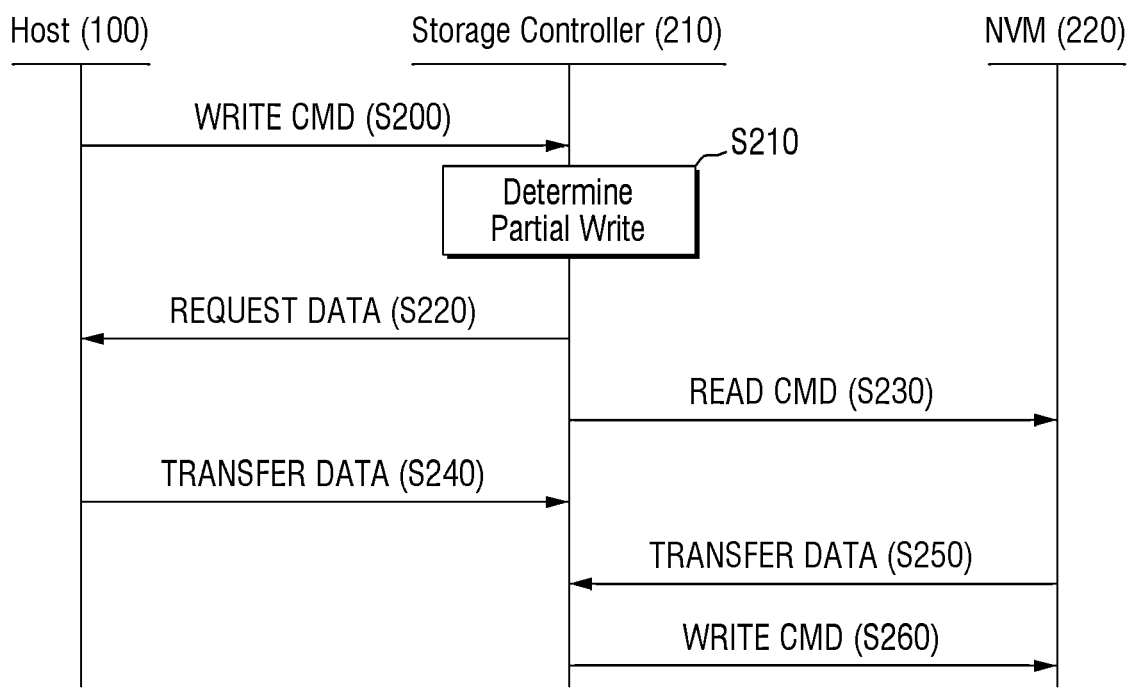
FIGS. 14 and 15 are diagrams for explaining the operation of the storage device according to some example embodiments.
Figure 15:
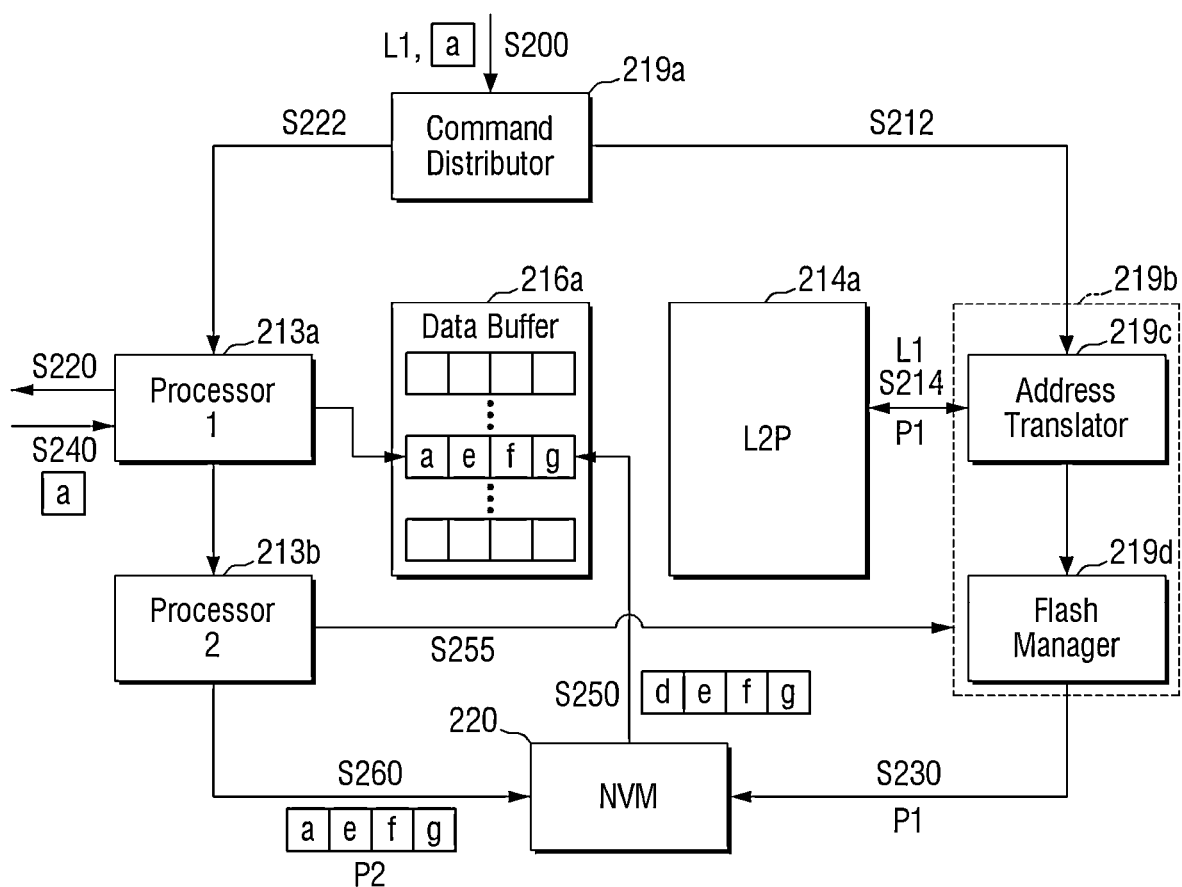

FIGS. 14 and 15 are diagrams for explaining the operation of the storage device according to some example embodiments.

Referring to FIGS. 14 and 15, the storage controller 210 receives the write command from the host device 100 (S200).

The write command provided (e.g., transmitted) from the host device 100 may be provided (e.g., transmitted) to the command distributor 219a of the storage controller 210.

The command distributor 219a of the storage controller 210 determines whether the write command received from the host device 100 is a partial write command (S210).

If the write command received from the host device 100 is a partial write command, the command distributor 219a gives the offload engine 219b orders that the data read is needed for the partial write (S212), and at the same time, gives the first processor 213a orders to request the data from the host device 100 for the write operation of the nonvolatile memory 220 (S222).

The first processor 213a requests the data from the host device 100 in response to this (S220), and the address translator 219c of the offload engine 219b searches the physical address of the nonvolatile memory 220 on the basis of the logical address received through the write command (S214).

Accordingly, the data request (S220) transmitted from the storage controller 210 to the host device 100 may be performed before a read command application operation (S230) provided (e.g., transmitted) from the storage controller 210 to the nonvolatile memory 220.

The read command application operation (S230), an operation of receiving the data a from the host device 100 (S240), an operation of reading the data d, e, f, and g from the nonvolatile memory 220 in response to the read command applied from the flash manager 219d (S250), an operation of checking whether the second processor 213b prepares the data capable of performing the partial write to the flash manager 219d (S255), and an operation of applying the write command of giving the nonvolatile memory 220 orders to write the data a, e, f, and g (S260) to be performed thereafter are the same as in the above-described embodiments. Thus, repeated explanation will not be provided.

As shown in at least FIGS. 14-15, the storage controller 210 may transmit a request signal (e.g., through the host interface 211) to request the first data at S220 and then provide (e.g., transmit) the read command to the nonvolatile memory 220 at S230 (e.g., through the memory interface 212) after the request signal is transmitted at S220, and the storage controller 210 may receive the first data at S240 after the read command is provided (e.g., transmitted) to the nonvolatile memory 220 at S230. Thus, the storage controller 210 may transmit the request signal at S220 before providing (e.g., transmitting) the read command to the nonvolatile memory 220 at S230. As further shown in at least FIGS. 14-15, the storage controller 210 may receive the first data from the host device 100 at S240 before the storage controller 210 receives the second data from the nonvolatile memory at S250.

Figure 16:
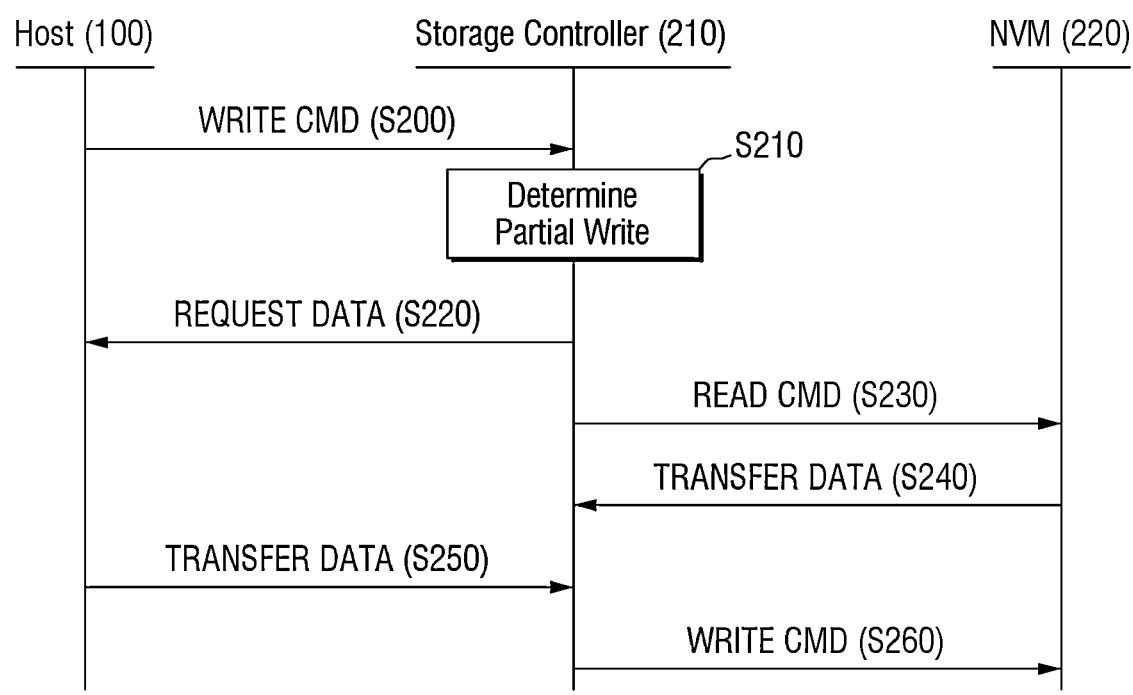
FIG. 16 is a diagram for explaining the operation of the storage device according to some example embodiments.

FIG. 16 is a diagram for explaining the operation of the storage device according to some example embodiments. Hereinafter, repeated description of the above-described example embodiments will not be provided, and the differences will be mainly described.

In some example embodiments, the storage controller 210 may receive the second data (e.g., data d, e, f, and g) from the nonvolatile memory 220 before receiving the first data (e.g., data a) from the host device 100. For example, referring to FIG. 16, in some example embodiments, after the read data (d, e, f, and g of FIG. 15) is received from the nonvolatile memory 220 (S240), the data (a of FIG. 15) is received from the host device 100 (S250).

In this case, the data e, f, and g are stored in the data buffer 216a first, and the data a may be stored later.

In concluding the detailed description, those skilled in the art will appreciate that many variations and modifications may be made to the preferred embodiments without substantially departing from the principles of the present inventive concepts. Therefore, the disclosed preferred embodiments of the inventive concepts are used in a generic and descriptive sense only and not for purposes of limitation.

What is claimed is:

1. A storage device, comprising:
a nonvolatile memory configured to store data that is written in size units of a mapping size; and
a storage controller configured to transmit a command to the nonvolatile memory,
wherein the storage controller includes
a host interface configured to receive a write command from a host device, the write command including a command to write first data to a first address and an indication that the first data has a first size, the first size being smaller than the mapping size,
a memory interface configured to transmit a memory command corresponding to the write command to the nonvolatile memory, and
processing circuitry configured to, in response to a determination that the first size is smaller than the mapping size and before the first data is received through the host interface,
transmit a read command to the nonvolatile memory to cause the nonvolatile memory to read second data stored in the nonvolatile memory addressed based on the first address through the memory interface, and
transmit a request signal to the host device requesting the first data independently from and in parallel to transmitting the read command to the nonvolatile memory.

2. The storage device of claim 1, wherein the processing circuitry is configured to
transmit the read command to the nonvolatile memory through the memory interface, and
transmit the request signal to the host device through the host interface to request the first data.

3. The storage device of claim 2, wherein the processing circuitry is configured to receive the second data from the nonvolatile memory, before receiving the first data from the host device.

4. The storage device of claim 1, wherein the processing circuitry is configured to transmit the request signal to the host device through the host interface to request the first data, before providing the read command to the nonvolatile memory through the memory interface.

5. The storage device of claim 4, wherein the processing circuitry is configured to receive the second data from the nonvolatile memory, before receiving the first data from the host device.

6. A method for operating a storage device, the method comprising:
providing a nonvolatile memory on which data is written in size units of a mapping size, and a storage controller that is configured to transmit a memory command to the nonvolatile memory;

receiving, at the storage controller, a write command that includes a command to write first data of a first size to a first address and an indication of the first size of the firs data; and in response to to a determination that the first size is smaller than the mapping size, before the first data is received at the storage controller, transmit a read command to the nonvolatile memory to cause the nonvolatile memory to read second data stored in the nonvolatile memory addressed based on the first address, and transmitting a request signal to requesting the first data independently from and in parallel to transmitting the read command to the nonvolatile memory.

7. The method for operating the storage device of claim 6, further comprising:

causing the storage controller to selectively refrain from transmitting the read command to the nonvolatile memory in response to a determination that the first size is a same size as the mapping size.

8. The method for operating the storage device of claim 6, further comprising:

causing the storage controller to search a second address of the nonvolatile memory based on the first address, wherein the read command includes a command to read the second data stored in the nonvolatile memory addressed to the second address.

9. The method for operating the storage device of claim 6, further comprising:

causing the storage controller to receive the second data from the nonvolatile memory, the second data having a size that is equal to the mapping size;

causing the storage controller to store the first data in a buffer memory; and causing the storage controller to store a limited portion of the received second data in the buffer memory that excludes a separate portion of the received second data that has a size that is equal to the first size, such that the limited portion of the received second data has a size that is equal to a difference between the mapping size and the first size.

10. The method for operating the storage device of claim 6, further comprising:

causing the storage controller to transmit the read command to the nonvolatile memory, and then transmit the request signal to request the first data after the read command is transmitted to the nonvolatile memory; and causing the storage controller to receive the first data.

11. The method for operating the storage device of claim 10, further comprising:

receiving the second data from the nonvolatile memory, before the storage controller receives the first data.

12. The method for operating the storage device of claim 6, further comprising:

causing the storage controller to transmit the request signal to request the first data, and then transmit the read command to the nonvolatile memory after the request signal is transmitted, and causing the storage controller to receive the first data after the read command is transmitted to the nonvolatile memory.

13. The method for operating the storage device of claim 12, further comprising:

receiving the first data at the storage controller, before the storage controller receives the second data from the nonvolatile memory.

* * * * *